Sept. 28, 1965   M. M. MARKOWITZ   3,208,882
METHOD OF GENERATING ELECTRICITY FROM LITHIUM AND NITROGEN
Filed Oct. 4, 1961

INVENTOR:
MEYER M. MARKOWITZ
BY
Howson & Howson
ATTYS.

United States Patent Office 3,208,882
Patented Sept. 28, 1965

3,208,882
METHOD OF GENERATING ELECTRICITY
FROM LITHIUM AND NITROGEN
Meyer M. Markowitz, Ardmore, Pa., assignor to Foote
Mineral Company, Philadelphia, Pa., a corporation of
Pennsylvania
Filed Oct. 4, 1961, Ser. No. 142,833
11 Claims. (Cl. 136—86)

This invention relates to lithium nitride, and more particularly, provides a novel dry cell or battery wherein an electrical potential is generated by formation of lithium nitride, a method of generating potential employing such a cell, and a novel method of making lithium nitride.

Dry cells are known wherein lithium acts as the anode and nitrogen as the cathode. In such cells, however, a protective barrier separates the metal from the gas, and their direct reaction is not involved in the generation of current.

That lithium metal will react with nitrogen is known. However, to effect this reaction, the lithium is heated to above its melting point. The product is a fused mass of lithium nitride, which, having a low surface area, is relatively unreactive.

It has been reported in the literature that under certain conditions, using dry nitrogen free of oxygen and hydrogen, lithium absorbs nitrogen at room temperature to form the nitride. However, more recent work with carefully defined reaction conditions has shown this to be false.

Room temperature reaction with nitrogen to form lithium nitride occurs with lithium amalgam, but mercury then forms a large proportion of the system, and contaminates the nitride.

It is an object of this invention to provide a novel method of forming lithium nitride.

A particular object of this invention is to provide a method of generating an electric current by means of reacting lithium with nitrogen to form the nitride.

Another object of this invention is to provide a novel dry cell or battery wherein lithium is the anode and lithium nitride is the cathode.

These and other objects will become evident from a consideration of the following specification and claims.

It has now been discovered that lithium will unite with nitrogen to form lithium nitride at room temperature, provided that the lithium is in the form of a solid body, of relatively low surface-to-volume area, and moisture is present at least at the initiation of the contact of the lithium with the nitrogen; and that thereby a potential difference is generated between the lithium phase and the lithium nitride phase.

Thus this invention provides a novel dry cell or battery, wherein lithium forms the anode and lithium nitride, the cathode.

A nitrogen-activatable cell is formed simply by a body of lithium having electrode collectors suitably connected thereto. Placed in an environment wherein moisture and nitrogen are directed against the surface of the body, and having its electrode collectors connected across an external load to complete an electrical circuit, this will generate current.

A complete dry cell or a battery of cells may include a source of moisture and of nitrogen, in accordance with this invention.

The body of lithium having electrode collectors connected thereto will suitably be maintained in a protective environment, such as in a container protecting it from access of the atmosphere, which may include means for directing moisture and nitrogen against the surface of the lithium body when it is desired to activate it.

The cell or battery embodiment of the invention will be more readily understood from a consideration of the drawings, in which.

Figure 1:
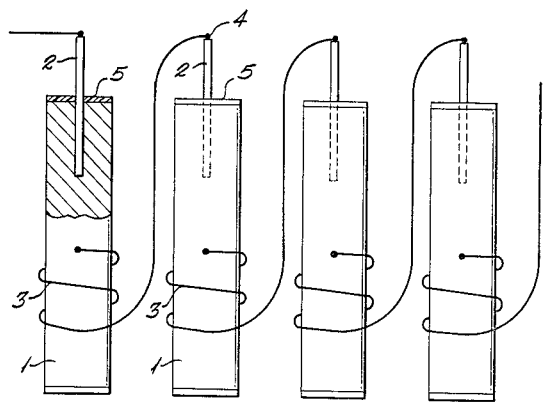
FIG. 1 is a side elevational view, partly in section of a battery of nitrogen-activatable cell embodiments of the invention.

The practice of the method of the invention, comprising directing moisture and nitrogen against the surface of a body of lithium, forms lithium nitride efficiently and in a desirable, substantially pure, porous, friable, reactive form. Thus the lithium nitride formed in the dry cells of this invention may advantageously be recovered, and indeed, the stated method may be practiced in itself as a novel and useful method of making lithium nitride.

When a stream of moist nitrogen is directed against the surface of a body of lithium in accordance with the present invention, lithium hydroxide is also formed. Surprisingly, however, it is formed only on the surface of the body. This surface coating seems to protect the interior from hydrolysis. The body becomes porous, for it retains its physical dimensions although lithium is considerably less dense than lithium nitride. Starting with the surface of the body exposed to contact with the nitrogen, and proceeding inwardly to the center, under this coating of hydroxide, the lithium is converted to nitride so long as the nitrogen is directed against its surface, until it is eventually converted completely to substantially pure nitride. Products of purities as high as 95% nitride have thus been produced.

By thus being able to form a phase of lithium nitride in continuous electrical contact with a phase of solid lithium in the course of being converted to lithium nitride, I am able to generate a potential difference of the magnitude of 0.15 volt. The amperage is low, but this is often not important for many applications requiring a stand-by source of potential, which does not degenerate with time as the conventional zinc dry cell does. The presently provided novel dry cells can be inactivated completely by protecting the body of lithium from access of reactants such as the moist nitrogen, and started up simply by allowing access of the nitrogen to the body. It can be started and stopped thus as frequently as desired. Because it is activated by an inert gas like nitrogen, it avoids all the problems of flooding, spilling and the like encountered with liquid-activated stand-by sources of potential, or of corrosion associated with reactive gases like chlorine which have previously been employed in such devices as activators.

Referring now to the practice of the invention, the body of lithium employed will have a relatively low surface-to-volume ratio. It need not be massive: for example, lithium wire of ⅛ inch diameter can be used effectively to practice the invention, in lengths as short as 1 or 2 inches. Of course, the lower the surface-to-volume ratio, the lower the ratio of lithium hydroxide coating to interior content of nitride will be, and this will favor a high purity nitride product when the nitride is being manufactured or recovered from used cells. Also, the larger the body, the longer a given cell can last before being exhausted by conversion of all the lithium to nitride. Maximum size will be limited only by consideration of the rate of diffusion of the nitrogen to the interior of the body. It will be appreciated that particular geometries can be developed which will maintain a constant area of the surface over which the lithium nitride phase is in contact with the lithium phase as the lithium is consumed, which may be varied, for example, depending on selection of a particular cell construction.

The lithium body may consist essentially of lithium or consist of an alloy of lithium. Of course, the alloying elements in this case should be solid at temperatures of operation: mercury, for example, being liquid, would flow on its release from the combination with lithium and shortcircuit the system. Alloying elements such as aluminum, magnesium and so forth can suitably be employed in the electrical systems of this invention. By using and by varying the amount of an alloying element in the lithium bodies in such systems, the amperage of the current produced may be varied. It is to be understood that, in the specification and claims herein, references to a solid body of lithium provided with electrode collectors are accordingly inclusive of such solid bodies of lithium alloys.

It will be appreciated that for the practice of this invention, the body will consist of lithium only initially. As soon as the body is exposed to moisture and nitrogen, it will include a lithium nitride phase, which will make up a larger and larger portion of the body as the exposure to nitrogen continues. Especially where generation of electricity is to be effected, it may be advantageous to preform the lithium nitride phase, so as to avoid an induction period. Therefore, where reference is made herein, in the specification and claims to a solid body of lithium, this is to be understood as inclusive of a body of lithium including a lithium nitride phase.

The electrode collectors of the cells of this invention will be positioned in the body of lithium so that one, the cathode collector, is in a portion of the body which is close to a surface of the body exposed to contact with the nitrogen, and one the anode collector is in a portion of the body removed from the surface of the body which is exposed to contact with the nitrogen. To generate current, one electrode collector must be in contact with a lithium nitride phase, and the other in a lithium phase of the same continuous body. For example, one may be in the center of a cylindrical body exposed on its exterior surface to the nitrogen. The center is the last to be converted from lithium to the nitride, the conversion proceeding from the exterior to the interior. The other electrode collector may be at the outer surface, either just below the outer surface so that the coating of lithium hydroxide forms above it, or so closely against the outer surface that it protects the surface from being converted to hydroxide at its point of contact therewith. In another arrangement, wherein the electrode collectors are not respectively in the interior and exterior of the lithium body, one electrode collector may contact a portion of a body of lithium not exposed to contact with the nitrogen, and another be in contact with another portion of the same body which is exposed to contact with the nitrogen. For example, lithium wire may be fed from a first chamber in which it is protected from the access of the nitrogen, through a gas-tight communicating outlet, into a second chamber in which it is contacted with the nitrogen, with one electrode collector in contact with lithium in the first chamber, and one in contact with a lithium nitride phase of the same body in the second chamber, to generate potential. Or instead, a block of lithium may be protected from access of nitrogen on all but one face, as by coating with a gas-impermeable film of a material such as rubber cement, or the like. One electrode collector will penetrate into the block for only a short distance from the protected face furthest from the exposed surface, thus remaining in lithium for the life of the cell and forming the anode. The other will go through the block to a point where it is close to the surface exposed to the nitrogen, so that at least soon after exposure of the body to nitrogen, this electrode collector will be in a nitride phase and form the cathode. It can be protected from electrical contact, as by a coating of insulation, over any portion of its length which goes through a portion of the lithium block removed from the surface exposed to the nitrogen, to avoid short-circuiting. Since the cathode collector is in the porous lithium nitride phase nitrogen diffusing into the lithium nitride necessarily contacts the cathode collector.

The electrode collectors may be made of any of a variety of materials customarily used as electrical contacts, electrically conductive and not highly reactive with other components of the system. Copper and copper alloys such as brass are suitable. Where desired, customary methods of insulating portions of the electrode collectors, such as providing a coating of shellac or the like, may be used. The shape of the electrode collectors can also vary: for example, they may be rods, plates and so forth.

The nitrogen-activatable cell embodiment of this invention desirably includes a protective envelope for the lithium body. Lithium metal is not attacked rapidly by the atmosphere, and indeed, may retain its silvery metallic appearance while standing exposed to the air for days. However, it would gradually be degraded by such standing, and to preserve it from reaction, it is customarily sealed in an air-tight container, or immersed in a protective fluid such as an oil, and so forth. The lithium body with electrode collectors disposed therein will preferably be so maintained in storage. It may, for example, then be removed from such a protective environment when it is to be put to use, and placed in any suitable arrangement available at the time to direct moist nitrogen against its surface: for example, it may be hung in an enclosure such as a box with inlets and outlets for the nitrogen and for the electrode contacts or even be simply suspended in the air in the path of the stream of the nitrogen. Alternatively, the cell may comprise a gas-tight container with the lithium body and at least portions of the electrode collectors contacting the lithium body disposed within the container, and the lithium may be maintained in the container when it is to be contacted with moisture and nitrogen. The cell may include means for introducing moisture and nitrogen into contact with the lithium body surface, or be so arranged that such means can be provided. For example, a hollow cylinder of lithium may be cast in a small tin can, with one electrode collector close to the outside and the other close to the hollow at the center. Before it is sealed, the hollow may be freed of air by drawing a vacuum on it or filling it with oil. The user can punch holes in both ends, direct a stream of moist nitrogen through it, and connect up the electrode collectors to his circuit, thereby obtaining potential.

The nitrogen source for practice of the methods of this invention will usually be a moving gas stream. Simply letting a solid body of lithium sit in a nitrogen atmosphere at atmospheric pressure does not produce enough penetration to the interior to effect significant conversion to nitride. Although the conversion might be effected by immersing the body in nitrogen under high superatmospheric pressures, such as from 500 to 5000 p.s.i., this will usually not be as practical as sweeping nitrogen over the surface of the body. Where a moving gas stream is used, the pressure may be atmospheric, superatmospheric or subatmospheric. For example, it has been shown that the invention can be practiced using an air stream, providing a partial pressure of nitrogen less than atmospheric. With air as the nitrogen source, the conversion to nitride is slower: thus, it usually will not be possible to obtain reasonably rapid conversion to nitride and generation of effective amounts of electrical power with gas streams containing much less than 30% nitrogen or at nitrogen partial pressures much below about one-third of atmospheric. On the other hand, superatmospheric pressures, as noted above can speed up the rate of conversion, and these may be used if desired up to, say, 5000 p.s.i.: for example, nitrogen may be fed from a pressure cylinder into a container in which the lithium body is located at a rate such that pressure builds up within the container. However, since the nitriding reaction is exothermic, this may build up enough heat even to melt the lithium, so it is preferred to use pressures of about atmospheric, and regulate the rate of reaction by regulating the rate of flow (space velocity) of the nitrogen. Preferably this will be regulated so that at least about 1 mol-%, preferably at least about 5 mol-% of the volume of nitrogen passed into contact with the lithium body surface is absorbed, and usually at least some of the nitrogen, such as about 5 mol-%, and generally about 10 mol-% or more, remains unreacted after it has passed out of contact with the lithium body.

One means of passing nitrogen into contact with the lithium surface is a simple pump whereby air is forced, as a moving stream, through a volume of space, such as a space in a container, in which it will move against and over the surface of the body of lithium. Another means is to connect the volume of space containing the lithium with a source of nitrogen under pressure, such as a pressure tank, from which the nitrogen will be supplied as a moving gas stream. A moving air stream could even be produced by mounting the lithium cells on the frame of rapidly moving air-borne vessel such as a plane. If desired, cells or batteries provided in accordance with the invention may include suh a pump or a coupling for a pressure tank, or instead, they may themselves include a source of nitrogen, as for example a container of nitrogen under pressure from which nitrogen can be admitted to contact a surface of the lithium body when it is desired to operate the cell.

The cells or batteries of this invention including means for admission of nitrogen will also preferably include means for egress of an unabsorbed portion of the gas stream to provide for incomplete absorption thereof as mentioned above.

Moisture, that is, water in small amounts and preferably carried in a vapor stream, must be present at the initiation of the formation of the lithium nitride in conducting the presently provided novel invention. It can be shown, as above stated, that a body of lithium is inert to a stream of dry nitrogen at temperatures below its melting point such as room temperature. On the other hand, as now discovered, if moisture is present in the nitrogen gas when it is first contacted with the lithium body, regardless of whether the nitrogen gas contacted therewith as the reaction proceeds further is dry or is moist, conversion of the lithium to lithium nitride continues to take place. Thus, moisture may be present or absent, as convenient, subsequent to the initiation of the lithium nitride formation.

Liquid water cannot very well be contacted directly with the lithium body surface in practicing the invention, since the lithium hydroxide formed by its reaction with lithium would dissolve in an aqueous medium, exposing more lithium to this reaction, and interfering with nitride formation. Therefore, the moisture should be in the vapor phase, in that it is carried by a gas stream, such as the nitrogen stream or an air stream, for example.

The source of moisture for practice of the invention can be varied widely. A separate gas stream carrying the moisture can be used, or the nitrogen gas may carry the moisture. Preferably, for simplicity, a moist nitrogen gas stream will be used. When reference is made herein to a source of moist nitrogen, it is to be appreciated that the nitrogen may be initially moist as where humid air is the source thereof, or separate sources of nitrogen and moisture may be used, and the nitrogen caused to pick up the moisture before it is passed into contact with the lithium body. For example, the nitrogen may be passed through a bed of a hydrate salt from which it can pick up moisture at a controlled rate.

The extent of moistness can vary from saturation of the nitrogen on down to low values. At least enough water should be present in the gas contacting the lithium body surface initially to exert a partial pressure corresponding to the vapor pressure of lithium hydroxide monohydrate at room temperature. A suitable value is about 50% relative humidity employing atmospheric pressure.

The duration of contact of moisture with the lithium body may range from continuous contact throughout the period of contact of nitrogen with the lithium to contact for less than the time required for about 10% of the lithium body to be converted to nitride. As mentioned, the formation of a lithium hydroxide coating on the body, hydroxide being produced by reaction of lithium with water, is favorable, because it protects the interior nitride from hydrolysis. Therefore, moisture will desirably be present for at least sufficient of the time after initial contact of the nitrogen with the lithium body to produce such a coating on the surface exposed to contact with the moisture.

The cells of this invention do not need to include a container, as noted, and the body of lithium can simply be suspended in the path of a stream of nitrogen to activate the cell. If there is a container, it can be made of various materials solid at the temperatures of operation. As above noted, the nitriding process may be exothermic, and this may raise the lithium body temperature from room temperature up to 50–70° C., for example, so that the container should not be a material reacting at or below such temperatures if it contacts the lithium body directly, rather than being spaced by insulating separators from the lithium body. The material should have some corrosion resistance to water and also to ammonia, which is a hydrolysis product of lithium nitride that may occur under some conditions. The material of the container may, for example, be a heat resistant plastic material such as a phenolic resin, or metal, such as tinned steel, or a ceramic such as glass, and so forth.

Temperatures for operation of the methods of this invention can advantageously be about room temperature. When the rate of nitriding is enough to produce an exotherm, this generally will not interfere. It being an essential of this invention that the lithium be in solid form during its nitridation, the melting point of lithium is the upper limit for its practice. Using a temperature below room temperature will slow down the reaction of the lithium with nitrogen, but not stop it; and once started, it can exotherm the lithium body to a higher temperature. For example, freezing temperatures (0° C.) can be used so long as enough moisture can be put into the system.

Insofar as the nitride is desired as a product, when the lithium body has been completely converted to nitride, the converted body will consist of the nitride in substantially pure form, and can be used as much. If a powdered form of nitride is desired, this can easily be supplied, for the solid product is porous and friable, and can easily be ground up. Under some circumstances, it may be economical to recover the nitride product from exhausted electrical cells, particularly for the purpose of recovering its lithium content. Means for converting the nitride to lithium are well known in the art: for example, the nitride may be melted and electrolyzed to free its lithium content, or hydrolyzed to yield lithium hydroxide, which can either be used itself or converted to the chloride to be used for electrolysis to free the lithium as metal.

Referring now to the drawings, FIGURE 1 is a schematic side elevational view, partly in section, of a simple battery of cells useful to practice the invention. They are a series of identical lithium bodies 1, which can for example be one to two inch lengths of ⅛ inch diameter lithium wire. Each has an electrode (anode) 2 going down through its center, consisting for example of a single thin rod of copper. Each also has a winding of thin copper wire 3 intimately contacting the exterior surface of the lithium body 1. This wire is the cathode of the cell. Each cathode 3 makes an electrical connection 4 with the anode 2 of the next cell, with the anode of the first and cathode of the last cell left unconnected, thus forming a battery of cells. A thin layer of a coating 5 impermeable to nitrogen, such as rubber cement, covers the top of each cell, to prevent nitride from forming close to the anode by penetration through the top rather than the side of the lithium bodies.

To activate the cells, they are placed, each separated from the others by insulation such as an air space, in the path of a flow of moist nitrogen (not shown) and the potential develops as nitride is formed. To supply a current flow, the terminals are connected across an external load in an electrical circuit.

Figure 2:
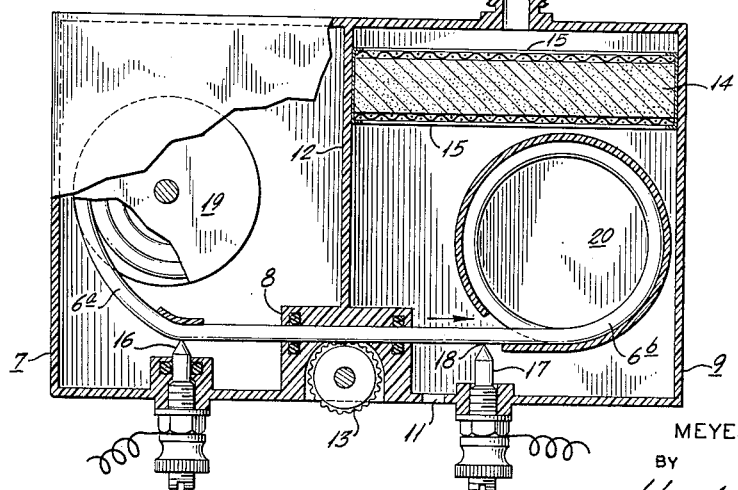
FIG. 2 is a side elevational view, partly in section, of a cell embodiment of the invention including a source of moisture and of nitrogen.

FIGURE 2 illustrates a cross sectional view of a cell in which a supply of a lithium body 6a in the form of a wire is enclosed in a gas-tight container 7 from which the wire exits through a gasketed, gas-proof outlet 8 into a chamber 9 provided with a coupling inlet 10 and an outlet opening 11. At the partition 12, a rotatable knurled wheel 13, located between container 7 and chamber 9 and contacting the lithium wire 6a as it passes through the outlet 8, projects below and outside of the assembly and can be turned, for example by hand, to drive the lithium 6a from container 7 into chamber 9. A bed of a hydrate salt 14 held between perforated plates 15, 15, lies across the path of a gas entering chamber 9 at inlet coupling 10 and exiting at outlet 11. An anode 16 contacts the lithium body inside container 6 and a cathode 17 contacts it in chamber 8.

To operate the cell, the coupling 10 is connected to a source of nitrogen, such as a pressure tank (not shown) from which it expands into chamber 9 where it passes through the bed of hydrate salt 14 picking up moisture, and then over the surface of the lithium body 6b, and finally exiting through outlet 11. This converts the portion of the lithium body 6b outside of gas-tight container 7 and within the chamber 9 to nitride.

The cathode collector 17 in contact with the lithium body 6b in chamber 9 is terminated by a sharp point 18 to scratch through coating on the body and contact interior nitride. With the anode collector in contact with a lithium phase 6a and cathode collector in contact with the nitride phase 6b of the continuous body, potential is available while nitrogen is admitted, and on connecting them into an electrical circuit, current flows.

The knurled wheel 13 can be turned to advance the lithium body gradually through outlet 8 to provide a continual fresh supply of lithium body in chamber 9, and the lithium wire thereby unwound from schematically indicated rotatable reel 19 on which the lithium body supply 6a is wound can be rolled up after conversion to the nitride phase 6b of the same continuous body on schematically indicated reel 20, from which it may be removed to be discarded or employed for recovery of its lithium values.

Figure 3:
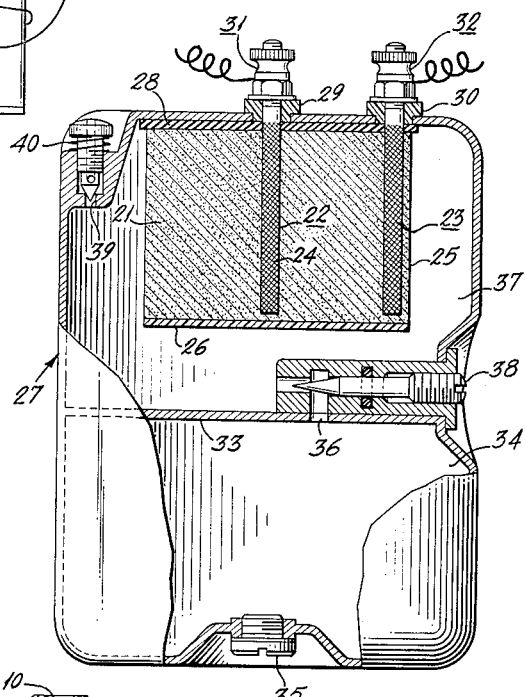
FIG. 3 is a side elevational view, partly in section, of another nitrogen-activatable cell embodiment of the present invention.

FIGURE 3 illustrates a self-contained cell unit, in which a thick cylinder of lithium 21 having an anode collector 22 embedded in the center of the cylindrical rod of lithium and a cathode collector 23 embedded in the rod close to the external side surface thereof. The electrodes have knurled surfaces 24 and 25 by which they are caught into the lithium body and support it. A gas-proof coating 26 protects the lower surface of the lithium body 21 from access of nitrogen. The body will also be protected from contact with the container 27 if this is a conductive material such as metal, by an insulating coating 28. The anode collector 22 and cathode collector 23 may also be protected from contact with the cell casing or container 27 as by insulation 29 and 30. The anode collector 22 and cathode collector 23 are provided with external current contact terminals 31 and 32. The lower part of the container 27 is walled off by a partition 33 to form a chamber 34 into which moist nitrogen is contained under pressure. This may be filled with the gas through an opening selectively closable by threaded plug 35. The chamber 34 also has an outlet opening 36 through which gas can exit from the chamber into the upper compartment 37 of the cell, and this can be opened or closed by a needle valve arrangement generally indicated at 38. The upper compartment 37 of the cell also has an outlet 39 through which gas can exit from it, which can be opened or closed by a needle valve arrangement generally indicated at 40.

To operate this cell, the needle valve 38 is opened, and moist nitrogen expands from chamber 34 into compartment 37, where it contacts the lithium body 21, is partly absorbed thereby, and then exits through outlet 39, which is also opened. As soon as the lithium body is converted to nitride far enough below the surface that the cathode collector 23 is in a nitride phase, a potential difference exists between the electrode collectors, and they can be used to supply power to an electrical circuit. By closing the needle valve 38, the cell can be inactivated again; if this is done and the outlet 39 is plugged to keep the lithium body out of contact with air, before all the lithium is converted to nitride, this cell will remain ready for reactivation, and can thus be used repeatedly.

The invention is illustrated but not limited by the following examples.

Example 1

This example illustrates the development of electric potential in conversion of a solid body of lithium to nitride.

Threaded brass screws connected to a vacuum tube voltmeter are inserted into the center and periphery respectively of a cylinder of lithium metal about 1 inch in diameter and weighing about 12 grams. The top and bottom of the cylinder are coated with rubber cement to prevent access of the nitrogen. A stream of nitrogen at about room temperature is 50% saturated with water vapor by bubbling it through an aqueous saturated solution of sodium dichromate, and moving at a rate of about 300–400 cubic centimeters per minute, is then directed against the exterior of the lithium cylinder. The voltmeter indicates a potential difference of 0.15 volt between the electrical connections. After about 4 hours, the lithium is completely converted to nitride.

A microscopic study of lithium rods converted to lithium nitride by the stated method shows that the red interior of lithium nitride is surrounded by a very thin greyish white coating of LiOH. The bulk lithium metal retains its original physical dimensions during the conversion to the nitride, and the nitride product is porous and friable. Purities of lithium nitride as high as 95% have been obtained.

Example 2

This example illustrates nitridation of a solid body of lithium using air.

A lithium cylinder like that described in Example 1 is placed in the path of an air stream of 50% relative humidity, moving at about the same rate as the nitrogen stream of Example 1. After about 4 hours, the gas stream is discontinued and the lithium body examined. The exterior is a thin white coating of lithium hydroxide. Below this and constituting the main part of the mass the body consists of red-brown porous lithium nitride. The central core of the cylinder remains silvery lithium after only 4 hours exposure.

Example 3

This example illustrates the purity of the nitride product of the invention.

A cylinder of lithium one inch in diameter and weighing 12.65 g. is treated with nitrogen gas brought to 50% relative humidity at room temperature as described in Example 1 until absorption of nitrogen ceases. The gain in weight is then measured, and found to be 8.95 g. The theoretical gain in weight for complete conversion to the nitride is 8.46 g. The additional gain in weight can be attributed to partial conversion of the lithium to lithium hydroxide in the initial stages of the reaction. The interior of the cylinder is substantially pure lithium nitride, and the solid product taken as a whole, including the coating, is better than 95% lithium nitride.

Example 4

This example illustrates the use of dry nitrogen for continuation of nitridation initiated in presence of moisture.

A one inch diameter lithium cylinder is held in the path of a stream of nitrogen gas brought to 50% relative humidity at room temperature by passage through sodium dichromate solution as described in Example 1. After a weight gain indicating about 10% conversion of the lithium to nitride, dried nitrogen is substituted for the moist nitrogen. The lithium body continues to absorb nitrogen and gain weight. Passage of dried nitrogen over the surface of the lithium body is continued until no further gain in weight takes place. The original lithium metal cylinder weight is 4.75 g., and the total gain in weight is 3.25 g. The product is substantially pure lithium nitride.

Example 5

This example illustrates the lack of activity of moist gas devoid of nitrogen and of dry nitrogen in the absence of moisture in the initial stages of reacting.

A one inch cylinder of lithium metal weighing 11.89 g. is maintained in the path of a moving stream of argon gas at 50% relative humidity at room temperature for 16 hours. The gain in weight is negligible: it is 0.50 g.

One inch cylinders of lithium metal are held in the path of a stream of dried nitrogen, and moisture is excluded from the initiation of the contact of the lithium surface with the nitrogen. The lithium does not react or absorb nitrogen, and does not gain in weight.

While the invention has been described with reference to various particularly preferred embodiments thereof, it is to be appreciated that modifications and variations can be made without departing from the scope of the invention as set forth in the foregoing specification and the following claims.

What is claimed is:

1. The method of generating electric potential at temperatures less than the melting point of lithium which comprises directing nitrogen, and, at least initially moisture, against the surface of a solid lithium body having a relatively low surface-to-volume ratio and having a cathode collector in said body close to said surface and an anode collector in said body remote from said surface until there is formed on said surface an outer layer of lithium hydroxide and an underlying layer of porous lithium nitride in which is said cathode collector but which does not contact said anode collector, and thereafter continuing to direct nitrogen against said body whereby nitrogen diffuses through said outer layer of lithium hydroxide and into said porous lithium nitride thereby contacting said cathode collector and converting additional lithium metal to lithium nitride.

2. The method of generating an electrical current which comprises conducting the method of claim 1 with said anode collector and said cathode collector connected across an external load to complete the circuit.

3. The method of generating electrical potential at temperatures below the melting point of lithium which comprises directing nitrogen against a body having a relatively low surface-to-volume ratio and having an outer layer of lithium hydroxide, a phase of porous lithium nitride underlying said outer lithium hydroxide layer and a phase of lithium metal underlying said lithium nitride phase, there being an anode collector in said lithium metal phase and a cathode collector in said lithium nitride phase whereby nitrogen diffuses through said outer layer of lithium hydroxide and into said porous lithium nitride thereby contacting said cathode collector and converting additional lithium metal to lithium nitride.

4. The method of generating an electrical current which comprises conducting the method of claim 3 with said anode collector and said cathode collector connected across an external load to complete the circuit.

5. A nitrogen-activatable cell comprising a solid body of lithium, having a relatively low surface-to-volume ratio, provided with a cathode collector in said body close to an external surface thereof exposed to contact with a gas stream directed against said surface and an anode collector in said body remote from said surface.

6. A dry cell adapted to provide electric potential comprising a gas-tight cell compartment containing the nitrogen-activatable cell of claim 5, and means for contacting moisture and nitrogen with the body of lithium in said cell compartment comprising a source of moisture and of nitrogen and means for obtaining open gas flow between said cell compartment and said source of nitrogen and of moisture.

7. A nitrogen-activatable cell comprising a solid body having a relatively low surface-to-volume ratio and having an outer layer of lithium hydroxide, a phase of porous lithium nitride underlying said outer layer of lithium hydroxide and a phase of lithium metal underlying said lithium nitride phase; an anode collector in said lithium metal phase and a cathode collector in said lithium nitride phase.

8. The cell of claim 7 including also means for directing nitrogen against said body for diffusion through said lithium hydroxide layer and into said porous lithium nitride phase.

9. A dry cell adapted to provide electric potential comprising a gas-tight cell compartment containing the nitrogen-activatable cell of claim 7, and means for contacting nitrogen with said body in said cell compartment comprising a source of nitrogen and means for obtaining open gas flow between said cell compartment and said source of nitrogen.

10. The cell of claim 7 wherein the lithium metal makes up a major portion of said body.

11. The cell of claim 9 wherein the lithium makes up a major portion of said body.

References Cited by the Examiner

UNITED STATES PATENTS 3,014,084  12/61  Ciarlariello _____ 136—86

JOHN H. MACK, *Primary Examiner.*

JOSEPH REBOLD, *Examiner.*